US012664070B2

(12) United States Patent
Lee et al.

(10) Patent No.: US 12,664,070 B2
(45) Date of Patent: Jun. 23, 2026

(54) ROOT CAUSE ANALYSIS SYSTEM AND ROOT CAUSE ANALYSIS METHOD IN HETEROGENEOUS VIRTUALIZATION ENVIRONMENT

(71) Applicant: OKESTRO CO., LTD., Seoul (KR)

(72) Inventors: Chang Hoon Lee, Seoul (KR); Min Jae Song, Seoul (KR); Eun Soo Ko, Seoul (KR); Young Gwang Kim, Seoul (KR); Min Jun Kim, Seoul (KR)

(73) Assignee: OKESTRO CO., LTD., Seoul (KR)

( * ) Notice: Subject to any disclaimer, the term of this patent is extended or adjusted under 35 U.S.C. 154(b) by 110 days.

(21) Appl. No.: 18/513,043

(22) Filed: Nov. 17, 2023

(65) Prior Publication Data

US 2025/0103464 A1     Mar. 27, 2025

(30) Foreign Application Priority Data

Sep. 27, 2023     (KR) ........................ 10-2023-0130795

(51) Int. Cl.
  *G06F 9/44*          (2018.01)
  *G06F 11/3604*       (2025.01)
(52) U.S. Cl.
  CPC ................................ *G06F 11/3612* (2013.01)
(58) Field of Classification Search
  CPC .................................................. G06F 11/3612
  See application file for complete search history.

(56) References Cited

U.S. PATENT DOCUMENTS

| | | | |
|---|---|---|---|
| 10,684,940 B1* | 6/2020 | Kayal ................. | G06F 11/3688 |
| 2018/0210810 A1 | 7/2018 | Kulkarni et al. | |
| 2019/0286504 A1 | 9/2019 | Muntés-Mulero et al. | |
| 2021/0157710 A1* | 5/2021 | Alexander .......... | G06F 11/3476 |
| 2021/0234930 A1* | 7/2021 | Dinh ........................ | G06F 8/425 |
| 2022/0210218 A1* | 6/2022 | Nomura .............. | H04L 41/5003 |
| 2023/0057720 A1 | 2/2023 | Aradhya et al. | |
| 2024/0395388 A1* | 11/2024 | Fortkort .............. | G06N 3/0442 |

FOREIGN PATENT DOCUMENTS

| | | |
|---|---|---|
| CN | 116166505 A | 5/2023 |
| KR | 10-1690949 B1 | 12/2016 |
| KR | 10-1694284 B1 | 1/2017 |
| KR | 10-1955189 B1 | 3/2019 |
| KR | 10-2027749 B1 | 10/2019 |
| KR | 10-2068440 B1 | 1/2020 |
| KR | 10-2021-0100600 A | 8/2021 |

* cited by examiner

*Primary Examiner* — Hang Pan
(74) *Attorney, Agent, or Firm* — Sughrue Mion, PLLC

(57)     ABSTRACT

A root cause analysis system according to an embodiment of the present disclosure may include: an Analysis tool calculator that operates in a microservice environment and calculates a corresponding analysis tool, which is a member of analyzing a root cause of target software, based on comparison software configured of corresponding independent modules, which are independent modules classified by function to correspond to the target software, which is software to be analyzed; and a Cause analyser that analyzes the root cause of an abnormal operation occurring in the target software using the corresponding analysis tool.

10 Claims, 4 Drawing Sheets

ROOT CAUSE ANALYSIS SYSTEM AND ROOT CAUSE ANALYSIS METHOD IN HETEROGENEOUS VIRTUALIZATION ENVIRONMENT

CROSS-REFERENCE TO RELATED APPLICATION(S)

This application is based on and claims priority under 35 U.S.C. § 119 to Korean Patent Application No. KR10-2023-0130795, filed on Sep. 27, 2023, in the Korean Intellectual Property Office, the entire disclosure of which is herein incorporated by reference in its entirety.

TECHNICAL FIELD

The present disclosure relates to a root cause analysis system and root cause analysis method to provide a solution for root cause analysis of microservice software in a heterogeneous virtualization environment.

BACKGROUND

As computing devices are utilized in many industrial fields, various software, such as applications, are required depending on the use and purpose of use. To this end, software is being developed and released in various ways. Typically, the methods by which software is developed may be broadly classified into two types. The first is the monolith service development method, and the second is the microservice development method.

The monolos service development method is a single service in which all processes are closely combined, and has the advantage of simple initial structural design and development and short latency between internal processes. However, the monolos service development method has the disadvantages of low modularity, low scalability, and long build time. The microservice development method is one in which an application is built as independent components, and each application process is connected and executed as a service. The microservice development method has the advantages of improving developer productivity, enabling fast and continuous deployment, and increasing testability and stability. However, the microservice development method is inconvenient because the source storage and server are separated, and network issues may occur between each microservice. In particular, in a microservice environment, the monitoring and error handling methods for each microservice are different, making it difficult to comprehensively monitor the entire microservice.

RELATED ART DOCUMENT

Patent Document (Patent Document 0001) Korean Patent No. 10-2027749 (published on Oct. 2, 2019)

SUMMARY

The present disclosure is directed to addressing an issue associated with the related art, and to providing a root cause analysis system and root cause analysis method capable of effectively monitoring anomalies and root causes of microservices.

The root cause analysis system according to an embodiment of the present disclosure may include: an Analysis tool calculator that operates in a microservice environment and calculates a corresponding analysis tool, which is a member of analyzing a root cause of target software, based on comparison software configured of corresponding independent modules, which are independent modules classified by function to correspond to the target software, which is software to be analyzed; and a Cause analyser that analyzes the root cause of an abnormal operation occurring in the target software using the corresponding analysis tool.

In addition, the Analysis tool calculator may include: a Module collector that collects the corresponding independent module from an external server; a Simulator that builds the comparison software using the corresponding independent modules and simulates the comparison software through a predetermined control method; and a Root analyser that calculates the corresponding analysis tool based on result information, which is data generated while the comparison software is simulated.

In addition, the Analysis tool calculator may further include a Date collector that collects the result information composed of log information, metric information, and trace information generated during a simulation process utilizing different data collection members.

In addition, the Date collector may use a Fluentd data collection member for the log information, a Prometheus data collection member for the metric information, and a Jaeger data collection member for the trace information.

In addition, the Root analyser may calculate the corresponding analysis tool by performing deep learning based on the predetermined control method and the result information.

In addition, the Analysis tool calculator may further include a Comparison analyser that configures the comparison software by configuring the corresponding independent module identical to a target independent module, which is an independent module forming the target software, wherein, when the Module collector fails to collect the corresponding independent module that matches the target independent module, the Comparison analyser may configure the comparison software by including at least one corresponding independent module similar to the target independent module within the scope that a predetermined compensation condition is satisfied.

In addition, the Analysis tool calculator may further include a Correspondence analyser that calculates a coincidence rate of the result information for the root cause for two pieces of software using a predetermined comparison method, wherein the predetermined compensation condition may be a condition where the coincidence rate is greater than a predetermined reference.

In addition, the Analysis tool calculator may further include a Time predictor that calculates a creation time, which is a time expected for the Root analyser to calculate the corresponding analysis tool through deep learning, and the Cause analyser may include a Cause storage where a past analysis tool, which is a member of analyzing the root cause of past software, which is software that operates in a microservice environment in the past, is stored, and a Monitoring unit that selects one of the past analysis tools using a predetermined selection method during the time the corresponding analysis tool is calculated, and analyzes the root cause of the target software based on the selected past analysis tool when a predetermined replacement condition is satisfied.

In addition, the predetermined replacement condition is a condition in which the creation time exceeds a reference time. The Monitoring unit may consider a reference time when the comparison software is determined only with the corresponding independent module identical to the target independent module and a reference time when the comparison software is determined to include the corresponding independent module that is similar to and not identical to the target independent module differently from each other.

In addition, the predetermined selection method may include a first selection method selected based on whether detailed information matches in a predetermined order, and a second selection method that selects the highest correspondence rate.

In addition, there is further included an Interface calculator that provides a user interface to a requester who has requested root cause analysis of the target software, wherein the Interface calculator may provide a predetermined notification to the requester when a situation occurs in which the comparison software may be configured only with the corresponding independent module identical to the target independent module in a state where the Module collector analyzes the root cause of the target software with a trained corresponding analysis tool in a state where the corresponding independent module identical to the target independent module has not been collected.

The root cause analysis system according to an embodiment of the present disclosure may include an Analysis tool calculator that operates in a microservice environment and calculates a corresponding analysis tool, which is a member of analyzing a root cause of target software, based on comparison software configured of corresponding independent modules, which are independent modules classified by function to correspond to the target software, which is software to be analyzed.

The root cause analysis method according to an embodiment of the present disclosure may be implemented by a root cause analysis system and be configured to analyze a root cause of software operating in a microservice environment, wherein the method may include: calculating, by an Analysis tool calculator, a corresponding analysis tool, which is a member of analyzing the root cause of target software, based on comparison software configured of corresponding independent modules, which are independent modules classified by function to correspond to the target software, which is software to be analyzed; and analyzing, by a Cause analyser, the root cause of an abnormal operation occurring in the target software utilizing the correspondence analysis tool.

The root cause analysis system and root cause analysis method in a heterogeneous virtualization environment according to an embodiment of the present disclosure can increase failure analysis efficiency.

In addition, the reliability of microservices can be improved.

However, the benefits of the present disclosure are not limited to those mentioned above, and other benefits not mentioned herein will be clearly understood by those skilled in the art from the following description and the attached drawings.

4

Figure 3:
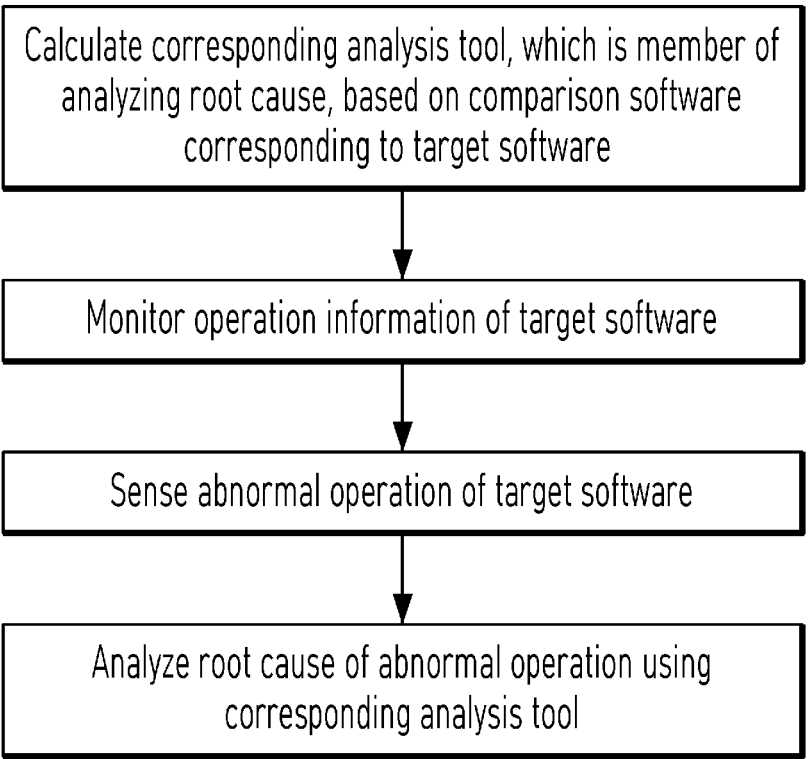

FIG. 3 is a flowchart of a root cause analysis method implemented by the root cause analysis system according to an embodiment of the present disclosure.

Figure 4:
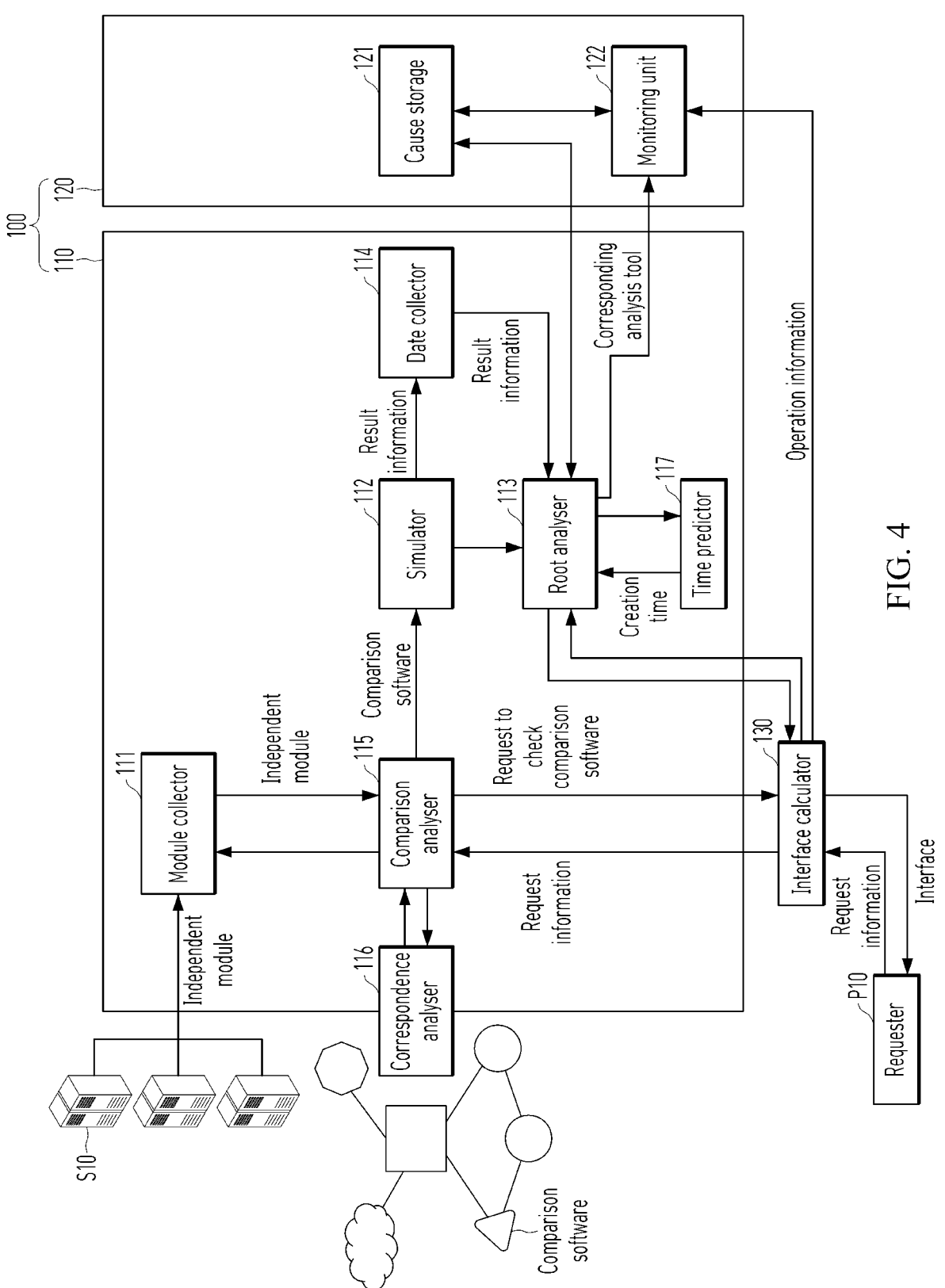

FIG. 4 is a diagram for explaining the driving of the root cause analysis system according to an embodiment of the present disclosure.

DETAILED DESCRIPTION

Hereinafter, specific embodiments of the present disclosure will be described in detail with reference to the drawings. However, the spirit of the present disclosure is not limited to the presented embodiments, and those skilled in the art who understand the spirit of the present disclosure will be able to easily suggest other regressive inventions or other embodiments included within the scope of the present disclosure by adding, changing, or deleting other components within the scope of the same spirit, but this will also be said to be included within the scope of the spirit of the present disclosure.

Figure 1:
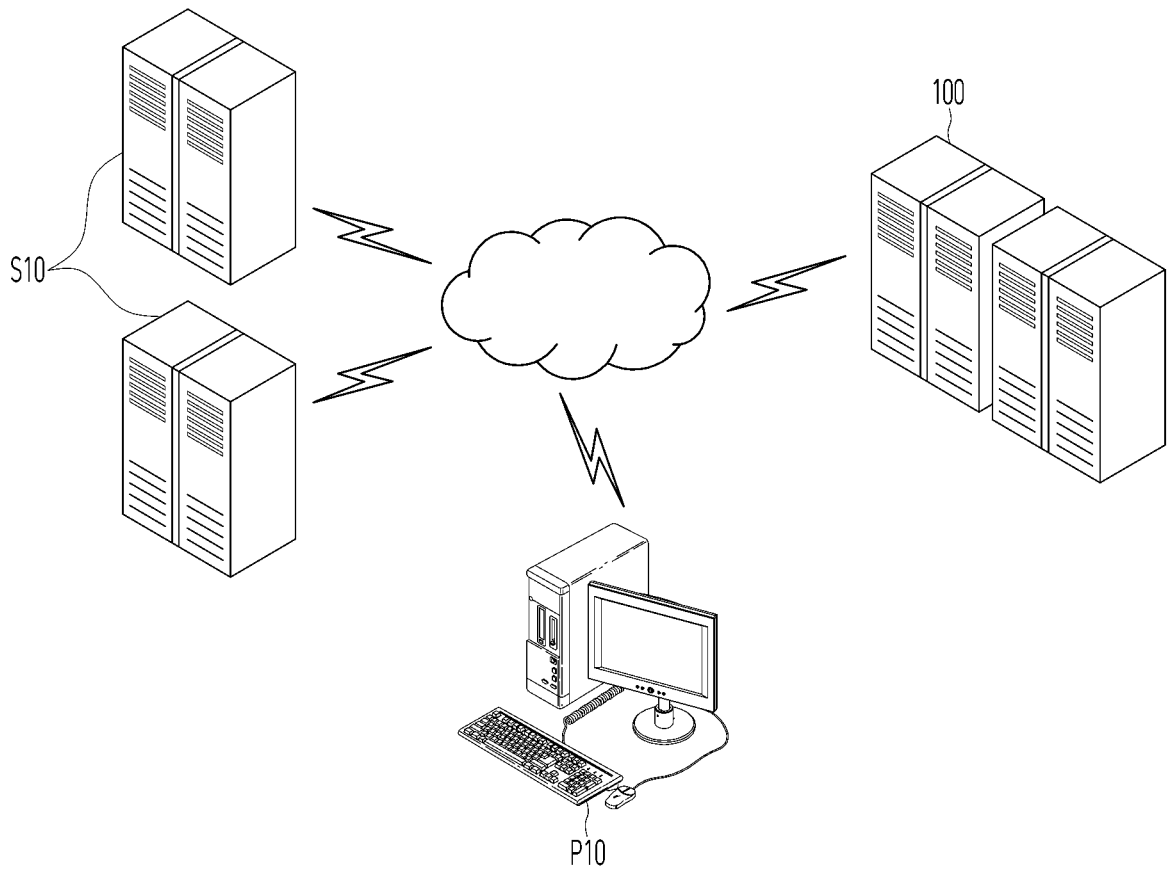
FIG. 1 is a relationship diagram of an root cause analysis system according to an embodiment of the present disclosure.

FIG. 1 is a relationship diagram of an root cause analysis system according to an embodiment of the present disclosure.

Referring to FIG. 1, a root cause analysis system 100 according to an embodiment of the present disclosure may be connected to an external server and a computing device of a requester in a wired or wireless network.

The wireless network mentioned in an embodiment of the present disclosure may be a core network integrated with a wired public network, a wireless mobile communication network, or a mobile Internet, and may refer to a worldwide open computer network structure that provides TCP/IP protocols and various services existing at the upper layer thereof, such as HTTP (Hyper Text Transfer Protocol), HTTPS (Hyper Text Transfer Protocol Secure), Telnet, FTP (File Transfer Protocol), DNS (Domain Name System), and SMTP (Simple Mail Transfer Protocol). The wireless network is not limited to examples, but comprehensively refers to a data communication network that may transmit and receive data in various forms.

An external server S10 may refer to a server that shares independent modules classified by function through the Internet network.

As an example, the external server may be a marketplace, and SockShop.

However, it is not limited thereto, and the types of external servers may be modified in various ways at a level that is obvious to those skilled in the art.

Each independent module may be executed and managed independently without sharing or inter-process communication.

For example, the independent modules may communicate with each other through APIs. The independent modules may be classified into software architectures by vertical function.

For example, an independent module may be a container.

However, it is not limited thereto, and the types of independent modules may be modified in various ways at a level that is obvious to those skilled in the art.

A requester P10 may be a person or company that uses corresponding software and requests root cause analysis of the corresponding software.

Hereinafter, the computing device of the requester and the requestor may be used with the same meaning.

The target software is software that operates on the computing device of a requestor and may refer to software on which root cause analysis is performed.

Software refers to a set of instructions that instruct a computer how to operate, and may include applications.

Herein, the software may be implemented on a virtual machine on a cloud server.

In addition, the software may be software that operates in a heterogeneous virtualization environment.

The computing device mentioned in an embodiment of the present disclosure may mean a device capable of processing information processing operations.

For example, computing devices may include mobile terminals including desktop computers, laptops, smartphones, PDAs (Personal Digital Assistants), PMPs (Portable Multimedia Players), portable terminals, and/or smart TVs.

The server mentioned in an embodiment of the present disclosure may include other components for performing a server environment. The server may include all arbitrary types of devices.

For example, the server as a digital device may be a digital device with a calculation capability, which has a processor installed therein and a memory, such as a laptop computer, a notebook computer, a desktop computer, a web pad, or a mobile phone.

In one example, the server may be a web server. However, it is not limited thereto, and the type of server may be changed in various ways at a level that is obvious to those skilled in the art.

The root cause analysis system 100 may collect independent modules from an external server and perform root cause analysis according to a request for root cause analysis from the requester P10.

The root cause analysis system 100 may be a type of server or computing device.

The root cause analysis system 100 may analyze the root cause by providing a virtual machine to the requester.

Hereinafter, the root cause analysis system will be described in detail.

Figure 2:
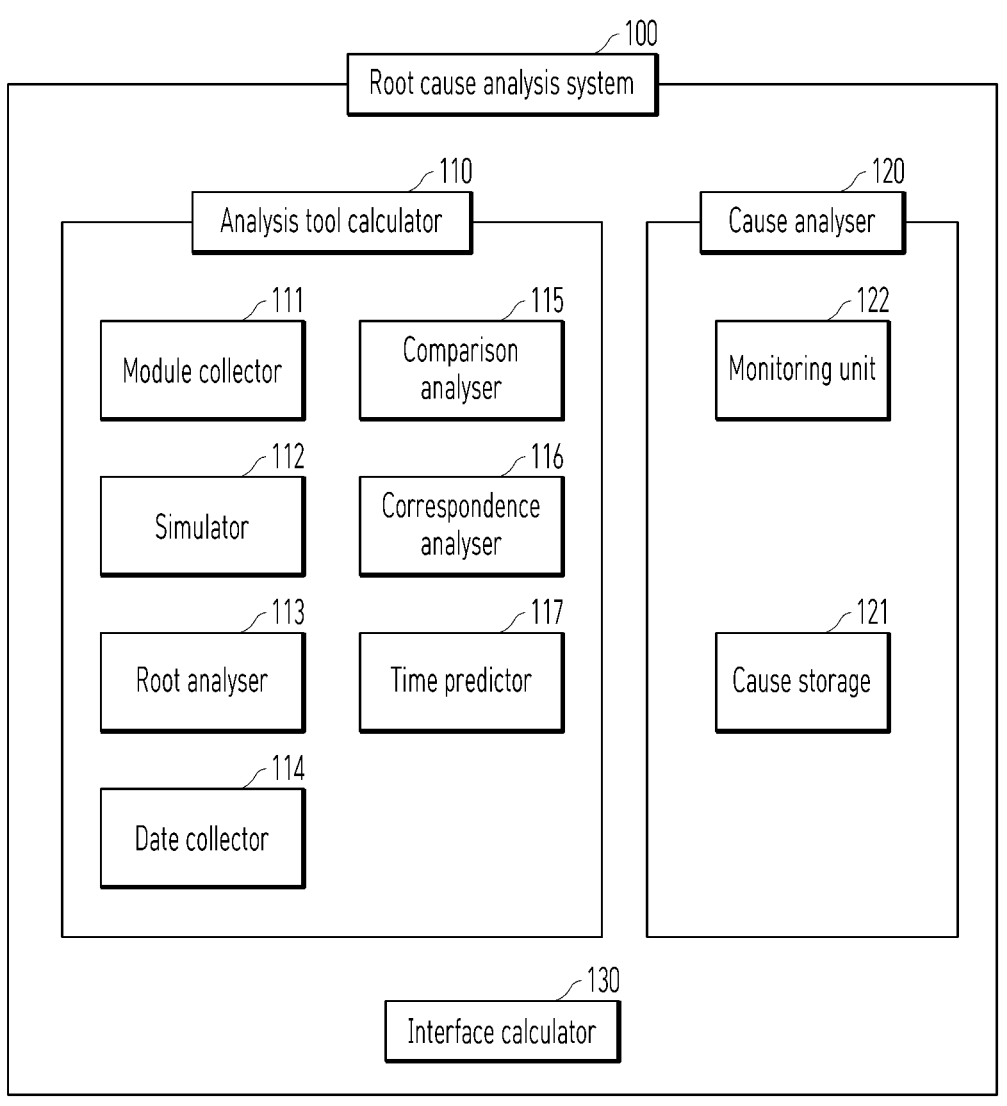
FIG. 2 is a configuration diagram of the root cause analysis system according to an embodiment of the present disclosure.

FIG. 2 is a configuration diagram of the root cause analysis system according to an embodiment of the present disclosure.

Referring to FIG. 2, the root cause analysis system according to an embodiment of the present disclosure may include: an Analysis tool calculator 110 that operates in a microservice environment and calculates a corresponding analysis tool, which is a member of analyzing a root cause of target software, based on comparison software configured of corresponding independent modules, which are independent modules classified by function to correspond to the target software, which is software to be analyzed; and a Cause analyser 120 that analyzes the root cause of an abnormal operation occurring in the target software using the correspondence analysis tool.

In addition, the root cause analysis system may further include an Interface calculator 130 that calculates an interface for communication among the Analysis tool calculator 110, the Cause analyser 120, and a requester and transmits the same to the requester.

The Analysis tool calculator 110 according to an embodiment of the present disclosure may include: a Module collector 111 that collects the corresponding independent modules from an external server; a Simulator 112 that builds the comparison software using the corresponding independent modules and simulates the comparison software through a predetermined control method; and a Root analyser 113 that calculates the corresponding analysis tool based on result information, which is data generated while the comparison software is simulated.

In addition, the Analysis tool calculator 110 may further include a Date collector 114 that collects the result information composed of log information, metric information, and trace information generated during a simulation process utilizing different data collection members.

In addition, the Analysis tool calculator 110 may further include a Comparison analyser 115 that configures the comparison software by configuring the corresponding independent module identical to the target independent module, which is an independent module forming the target software In addition, the Analysis tool calculator 110 may further include: a Correspondence analyser 116 that calculates a coincidence rate of result information for the root cause for two pieces of software using a predetermined comparison method; and a Time predictor 117 that calculates a creation time, which is the time expected for the Root analyser 113 to calculate the corresponding analysis tool through deep learning.

The Module collector 111 may collect corresponding independent modules, which are independent modules classified by function to correspond to the target software, from an external server.

An independent module identical or similar to the target independent module configuring the target software may be a corresponding independent module.

The Module collector 111 may collect independent modules forming the comparison software configured by the Comparison analyser 115 from an external server and deliver the same to the Comparison analyser 115.

The Module collector 111 may collect information about independent modules that may be collected through an external server, and may deliver the information about the independent modules that may be collected to the Comparison analyser 115.

For example, information about an independent module may include a function, version, manufacturer, and type of programming language of the independent module.

However, it is not limited thereto, and the specific types of information about the independent module may be modified in various ways at a level that is obvious to a person skilled in the art.

The Simulator 112 may simulate comparison software in which the Comparison analyser 115 is configured of corresponding independent modules.

In other words, the Simulator 112 may simulate comparison software using a predetermined control method.

Herein, the predetermined control method may be a method of operating the comparison software in a normal situation and an abnormal (failure) situation, respectively.

For example, a normal situation may mean a situation in which the comparison software operates in accordance with the purpose of use.

For example, a normal situation may mean a situation in which a series of processes such as search, ordering, payment, and sending delivery information are implemented without error when the comparison software is an application for online shopping.

For example, an abnormal situation may mean a situation in which an error occurs in a series of shopping processes, such as when the comparison software is an application for online shopping, a search is not possible, or the payment page has an error after ordering.

The Date collector 114 may collect the result information composed of log information, metric information, and trace information generated during a simulation process using different data collection members.

In other words, the Date collector 114 may collect necessary result information by installing a data collection member in each corresponding independent module.

For example, the log information may use a Fluentd data collection member, the metric information may use a Prometheus data collection member, and the trace information may use a Jaeger data collection member.

However, it is not limited thereto, and the types of data collection member utilized by the Date collector 114 may be modified in various ways at a level that is obvious to those skilled in the art.

The Root analyser 113 may calculate a corresponding analysis tool based on a predetermined control method and result information corresponding to a method implemented through the predetermined control method.

Specifically, the correspondence analysis tool may be calculated through deep learning based on the predetermined control method and the result information. The predetermined control method may include a method of controlling comparison software based on what the root cause is.

Herein, the deep learning may use the Back Propagation algorithm, which is an algorithm that updates the weights of the neural network using labeled data of the output layer, but is not limited thereto.

In addition, since the deep neural network and Back Propagation algorithm are known in the art, the detailed description thereof may be omitted.

When the Module collector 111 fails to collect the corresponding independent module that matches the target independent module, the Comparison analyser 115 may configure the comparison software by including at least one corresponding independent module similar to the target independent module within the scope that a predetermined compensation condition is satisfied.

The predetermined compensation condition may be a condition where a coincidence rate is higher than a predetermined reference.

For example, the predetermined reference may be a 90% of coincidence rate.

However, it is not limited thereto, and the specific values of the predetermined reference may be modified in various ways at a level that is obvious to those skilled in the art.

First, the Comparison analyser 115 may set the corresponding independent module as the same independent module as the target independent module, based on information about the target independent module configuring the target software contained in the request information of a requester.

However, when an independent module identical to the target independent module may not be collected from an external server, the Comparison analyser 115 may set an independent module similar to the target independent module as a corresponding independent module within the scope that a predetermined compensation condition is satisfied.

Comparison software may be configured by selecting an independent module that satisfies a predetermined compensation condition when replacing an independent module identical to the target independent module that may not be collected from an external server.

For this determination, the Comparison analyser 115 may request the Correspondence analyser 116 to determine the coincidence rate between the target software and the candidate comparison software.

The Correspondence analyser 116 may deep learn the information about the software, the control method of the software, the result information of the software according to the control method, and the coincidence rate for the result information, and deep learn a coincidence rate model that calculates the coincidence rate for the result information between software only with the software information.

Herein, the deep learning may use the Back Propagation algorithm, which is an algorithm that updates the weights of the neural network using labeled data of the output layer, but is not limited thereto.

In addition, since the deep neural network and Back Propagation algorithm are known in the art, the detailed description thereof may be omitted.

As a specific example, the Correspondence analyser **121*f*** may use information about software and the control method of the software as input values, label the result information of the software according to the control method for the input value and use a pair of a first coincidence rate model and the result information calculated through deep learning as input values, and label the coincidence rate for the pair of result information and learn a second coincidence rate model calculated through deep learning.

Herein, the software information may include information about the independent modules that forms the software (functions of the independent modules, versions, manufacturers, types of programming languages, connection relationships between independent modules, etc.). For example, an arbitrary independent module may be an independent module that implements a payment process, the version may be ver 3.1, the manufacturer may be google, and the type of programming language may be C++. However, an embodiment of the present disclosure is not limited thereto.

Herein, the control method of the software may mean a method of driving the software. For example, the software control method of the software may be a control method for ordering an arbitrary product as a non-member for software that provides a shopping mall service. For example, the control method of the software may be a control method in which 100 orderers order a product simultaneously. However, an embodiment of the present disclosure is not limited thereto.

Herein, the result information of the software according to the control method may mean log information generated by the software according to the control. For example, the result information may be log information.

The result information of the software may be configured of log data. For two pieces of result information, the more log data with the same error code in the contents of the log data, the higher the coincidence rate between the result information may be. Conversely, for two pieces of result information, the less log data with the same error code in the contents of the log data, the lower the coincidence rate between the result information may be.

For example, the coincidence rate may be expressed as a numerical value between 0% and 100%.

However, it is not limited thereto, and the expression method for expressing the coincidence rate may be modified in various ways at a level that is obvious to those skilled in the art.

Unlike the aforementioned example, the first coincidence rate model may be received from an external server and utilized, or the Simulator **121*b*** may be utilized instead of the first coincidence rate model.

The Correspondence analyser **121*f*** may input information on a plurality of pieces of candidate comparison software, information on target software, and methods for controlling each piece of software into the coincidence rate model, and calculate the coincidence rate between two pieces of software.

The Time predictor 117 may calculate the time expected for the Root analyser 113 to calculate the corresponding analysis tool through deep learning.

For example, the Time predictor 117 may learn a time prediction model by deep learning based on information about past comparison software (functions of independent modules, versions, manufacturers, types of programming languages, connection relationships between independent modules, etc.) and the learning time of the past correspondence analysis tool.

As a specific example, the Time predictor 121g may learn a time prediction model by using information about comparison software as an input value and deep learning the learning time labeled in the input value.

For example, the information about the comparison software may be embedded, vector values and learning times may be labeled, and the expected learning time may be predicted with vector similarity values of the information about the comparison software. For example, the vector similarity value may utilize cosine similarity, but an embodiment of the present disclosure is not limited thereto.

Herein, the deep learning may use the Back Propagation algorithm, which is an algorithm that updates the weights of the neural network using labeled data of the output layer, but is not limited thereto.

In addition, since the deep neural network and Back Propagation algorithm are known in the art, the detailed description thereof may be omitted.

The Time predictor 117 may receive information about the comparison corresponding software from the Root analyser 113 and/or the Comparison analyser 115 and utilizes the time prediction model to calculate a creation time, which is the learning time of the corresponding analysis tool.

The Cause analyser 120 according to an embodiment of the present disclosure may include: a Cause storage 121 that stores a past analysis tool, which is a member of analyzing a root cause of past software, which is software operated in a microservice environment in the past; and a Monitoring unit 122 that selects one of the past analysis tools using a predetermined selection method during the time the corresponding analysis tool is calculated, and analyzes the root cause of the target software based on the selected past analysis tool when a predetermined replacement condition is satisfied.

The Cause storage 121 may store information about past software and past analysis tools in a manner that matches each other.

For example, information about past software may include the functions, versions, manufacturers, types of programming languages, and connection relationships between independent modules that configure the software.

The Cause storage 121 may store all of the history of the analysis tool being driven.

For example, the history of operation information input to the analysis tool, root cause results analyzed by the analysis tool, etc. may be stored in the Cause storage 121.

The Monitoring unit 122 may determine whether the target software operates abnormally by monitoring operation information, which is data generated from the target software driving on the computing device or virtual machine of a requester.

Herein, the operation information may include log information, metric information, and trace information of the target software.

In addition, in order to perform the failure determination function of the Monitoring unit 122, a deep learning-based failure determination model may be utilized, and detailed descriptions thereof may be omitted to the extent of overlap with known technologies.

In other words, the Monitoring unit 122b may request a failure determination model that determines whether the software is operating abnormally based on log information, metric information, and trace information from an external server or may have the same stored in advance.

For example, the external server may be a server driving a platform that provides open source.

When the Monitoring unit 122 determines that the target software operates abnormally, it may perform causal analysis based on the operation information determined to be abnormal.

To perform this causal analysis, a deep learning-based or big-data based causal analysis model may be utilized, and detailed descriptions thereof may be omitted to the extent of overlap with known technologies.

For example, the Monitoring unit 122b may receive a model for analyzing the cause of abnormal operation from an external server.

For example, the causal analysis model may be a model in which patterns of log data, metric data, and trace data and causes of errors corresponding to the patterns are managed in a database. The Monitoring unit 122b may determine the cause of the error based on the pattern of operation information of the corresponding software.

The Monitoring unit 122 may understand the root cause of the failure of the target software by inputting operation information into the corresponding analysis tool.

The information about the root cause understood by the Monitoring unit 122 may be delivered to the Interface calculator 130, and the Interface calculator 130 may calculate an interface that displays the root cause by overlapping a relationship image of the corresponding independent modules and transmit the same to a requester.

Herein, failure determination, causal analysis, and root cause analysis may be performed sequentially, but an embodiment of the present disclosure is not limited thereto, and the order of each determination/analysis may be changed or performed in parallel.

The Monitoring unit 122 may analyze the root cause of the failure of the target software using either a corresponding analysis tool or a selected past analysis tool.

Specifically, the Monitoring unit 122 may utilize a past analysis tool selected while the corresponding analysis tool is being learned by the Root analyser 113. However, once the corresponding analysis tool is created, the Monitoring unit 122 may utilize the corresponding analysis tool rather than the selected past analysis tool.

The predetermined replacement condition may be a condition in which the creation time of the corresponding analysis tool exceeds a reference time.

Herein, the Monitoring unit 122 may consider a reference time when the comparison software is determined only with the corresponding independent module identical to the target independent module and a reference time when the comparison software is determined to include the corresponding independent module that is similar to and not identical to the target independent module differently from each other.

For example, the reference time when the comparison software is determined only with the corresponding independent module identical to the target independent module may be defined as a first reference time, and the reference time when the comparison software is determined to include the corresponding independent module that is similar but not identical to the target independent module may be defined as a second reference time.

The first reference time may be longer than the second reference time.

This may be to alleviate service gaps during the time when the response analysis tool is trained by considering the second reference time to be shorter in order to provide better service to a requester.

In addition, the predetermined replacement condition may further include a condition that a requester approves to allow root cause analysis through the past analysis tool during the learning time of the corresponding analysis tool.

In addition, the predetermined replacement condition may be a condition in which at least one past analysis tool is selected using a predetermined selection method.

The Monitoring unit 122 may learn a model that calculates the correspondence rate between the correspondence analysis tool and the past analysis tool stored in the Cause storage 121.

The Monitoring unit 122 may learn a correspondence rate model through deep learning that calculates a correspondence rate based on whether the root cause analyzed by the analysis tool matches when the same operation information is input to the analysis tool.

To this end, the Monitoring unit 122 may receive information about root cause analyses performed in the past (for example, analysis tools, operation information input to the analysis tool, root cause of failure calculated by the analysis tool, etc.) from the Cause storage 121, and the Monitoring unit 122 may learn the correspondence rate model by deep learning based on the information received from the Cause storage 121.

Herein, the deep learning may use the Back Propagation algorithm, which is an algorithm that updates the weights of the neural network using labeled data of the output layer, but is not limited thereto.

In addition, since the deep neural network and Back Propagation algorithm are known in the art, the detailed description thereof may be omitted.

Specifically, the Monitoring unit 122b may generate the correspondence rate model through deep learning based on information about the two root cause analyses (operation information, information about the analysis tool, the root cause of the failure calculated by the analysis tool, and information about the independent modules configuring the software that is the basis of the analysis tool) and data labeled with a similar degree between the information about the two root cause analyses.

Herein, the degree of similarity between information on root cause analyses may be calculated as the degree of similarity of operation information, degree of similarity of software, and degree of similarity of root causes.

For example, the similarity of operation information may be calculated as the difference in metric data and the cosine similarity of embedded vector values of log data.

For example, the degree of similarity of software may be calculated as cosine similarity between vectors by embedding information about independent modules configuring the software.

For example, the degree of similarity of root causes may be calculated as cosine similarity between vectors by embedding root cause information.

To this end, each piece of information is configured of natural language, and a natural language processing model may be utilized.

For example, for two analysis tools, the greater the difference between an average value of the degree of similarity of operation information and degree of similarity of software and the degree of similarity of root causes, the smaller the degree of correspondence between the two analysis tools may be.

For example, in contrast, for two analysis tools, the greater the sameness between an average value of the degree of similarity of operation information and degree of similarity of software and the degree of similarity of root causes, the greater the degree of correspondence between the two analysis tools.

When result information, information about predetermined control methods, and information about comparison software are input into the correspondence rate model, the correspondence rate between the corresponding analysis tool to be produced in the future and the past analysis tool may be calculated.

The higher the correspondence rate, the higher the probability that the analysis results of root cause will match, and the lower the correspondence rate, the lower the probability that the analysis results of root cause will match.

For example, the correspondence rate may be expressed as a numerical value between 0% and 100%.

However, it is not limited thereto, and the specific numerical value indicating the correspondence rate may be modified in various ways at a level that is obvious to those skilled in the art.

A predetermined selection method may be a method of selecting past analysis tools that match the analysis results of root cause of the corresponding analysis tool by exceeding a predetermined reference (correspondence rate). To this end, the Monitoring unit 122 may calculate the correspondence rate of the corresponding analysis tool to be produced in the future and the past analysis tool stored in the Cause storage 121a using the correspondence rate model.

For example, the predetermined reference (correspondence rate) may be 90%.

However, it is not limited thereto, and the specific values of the predetermined reference may be modified in various ways at a level that is obvious to those skilled in the art.

In addition, the predetermined selection method may include a first selection method selected based on whether detailed information matches in a predetermined order, and a second selection method that selects the highest correspondence rate.

When a first correspondence rate section exists, the Monitoring unit 122 may select one analysis tool among past analysis tools according to the first selection method.

For example, the first correspondence rate section may be a section where the correspondence rate is greater than 95% and less than 100%.

However, it is not limited thereto, and the specific value of the first correspondence rate section may be modified in various ways at a level that is obvious to those skilled in the art.

In contrast, when the first correspondence rate section does not exist and a second correspondence rate section exists, the Monitoring unit 122 may select one analysis tool among past analysis tools according to the second selection method, not the first selection method.

For example, the second correspondence rate section may be a section where the correspondence rate is greater than 90% and less than 95%.

However, it is not limited thereto, and the specific value of the second correspondence rate section may be modified in various ways at a level that is obvious to a person skilled in the art.

The first selection method may be a method of selecting a past analysis tool whose detailed information matches the detailed information of the corresponding analysis tool among past analysis tools that correspond to the corresponding analysis tool by the first correspondence rate section.

The detailed information may refer to information about the software that is the basis of the correspondence analysis tool.

For example, the detailed information may include the programming language of the software underlying the analysis tool, the version of the software, and the manufacturer of the software.

However, it is not limited thereto, and the specific contents of the detailed information may be modified in various ways at a level that is obvious to those skilled in the art.

Herein, when there are a plurality of pieces of matching detailed information, the matching detailed information may be checked in a predetermined order and one of the past analysis tools may be selected.

For example, it may be assumed that there are past analysis tools 'A', 'B', and 'C' that correspond to the corresponding analysis tool as many as the first correspondence rate section.

Herein, when assuming that the detailed information of the corresponding analysis tool is 'Java' programming language, '3.0 Ver.', and 'Q manufacturer', the detailed information of the 'A' analysis tool is 'C language' programming language, '2.1 Ver.', and 'Q manufacturer,' the detailed information of the 'B' analysis tool is 'Java' programming language, '3.1 Ver.', and 'Q manufacturer,' and the detailed information of the 'C' analysis tool is 'C language' programming language, '3.1 Ver.', and 'Q manufacturer,' even though the manufacturer of all past analysis tools is the same as the manufacturer of the corresponding analysis tool, the 'B' analysis tool with the matching programming language may be selected according to a predetermined order.

For example, the predetermined order may be programming language, version, and manufacturer.

However, it is not limited thereto, and the specific order of the predetermined order may be changed in various ways at a level that is obvious to those skilled in the art.

Because a coincidence rate of root cause analysis is high when the programming language matches, the programming language may be considered in the first order.

The Interface calculator 130 may provide a user interface to a requester who has requested root cause analysis of the target software.

Specifically, the Interface calculator 130 may calculate a user interface through which a requester, the Analysis tool calculator 110, and the Cause analyser 120 may communicate with each other or one another and provide the same to the requester.

For example, the Interface calculator 130 may calculate a user interface displaying images and icons for requesting analysis of the root cause by a requester and provide the same to the requester.

For example, the Interface calculator 130 may calculate a user interface through which a requester may input request information and provide the same to the requester.

Herein, the request information may include an application form requesting root cause analysis and information about the target software (functions of the independent modules, versions, manufacturers, types of programming languages, connection relationships between independent modules, etc.).

For example, the Interface calculator 130 may display information about comparison software, calculate a user interface requesting approval to finalize comparison software, and provide the to a requester. In this connection, a configuration requesting the requester to select a corresponding independent module similar to the target independent module may be displayed on the user interface.

For example, when a predetermined replacement condition is satisfied, while the corresponding analysis tool is being learned, the Interface calculator 130 may calculate a user interface that may query a requester about whether to perform monitoring tasks in place of the past analysis tool and return the decision of the requester.

After the comparison software is configured to include at least one corresponding independent module similar to the target independent module within the scope that the predetermined compensation condition is satisfied, in a situation where root cause analysis is performed using a corresponding analysis tool or a past analysis tool, when a situation occurs in which comparison software may be configured only with corresponding independent modules that are identical to the target independent module, the Interface calculator 130 may provide a predetermined alarm to a requester.

Herein, the predetermined alarm may be an alarm informing a requester that the corresponding analysis tool may be updated.

Thus, a requester may change the corresponding analysis tool to a more accurate corresponding analysis tool.

To this end, the Module collector 111 may search and collect independent modules that did not exist in the past in real time.

Hereinafter, the root cause analysis method implemented by the root cause analysis system will be described in detail.

FIG. 3 is a flowchart of a root cause analysis method implemented by the root cause analysis system according to an embodiment of the present disclosure. FIG. 4 is a diagram for explaining the driving of the root cause analysis system according to an embodiment of the present disclosure.

Referring to FIGS. 3 and 4, the root cause analysis method according to an embodiment of the present disclosure may be implemented by a root cause analysis system and be configured to analyze a root cause of software operating in a microservice environment, wherein the method may include: calculating, by the Analysis tool calculator 110, a corresponding analysis tool, which is a member of analyzing the root cause of target software, based on comparison software configured of corresponding independent modules, which are independent modules classified by function to correspond to the target software, which is software to be analyzed; and analyzing, by the Cause analyser 120, the root cause of an abnormal operation occurring in the target software utilizing the correspondence analysis tool.

A requester may request root cause analysis or monitoring of the target software through the user interface provided by the Interface calculator 130.

The computing device of a requester may transmit request information to the Interface calculator 130.

The request information received by the Interface calculator 130 may be transmitted to the Comparison analyser 115 and/or the Module collector 111, and the Module collector 111 may collect independent modules for configuring comparison software from an external server based on the request information.

The Comparison analyser 115 may configure comparison software based on the independent modules collected by the Module collector 111.

Herein, the comparison software may be configured of independent modules that are all identical to the target independent modules, or may be configured of an independent module identical to the target independent module and an independent module similar to the target independent module. To this end, the Correspondence analyser 116 may perform a coincidence rate analysis and transmit the analysis results to the Comparison analyser 115.

The detailed description thereof may be omitted to the extent of overlap with the aforementioned content.

The Interface calculator 130 may receive confirmation from a requester regarding the comparison software determined by the Comparison analyser 115.

This may be because the comparison software may include independent modules that are not identical to the target independent module. In this connection, information about the independent module that is not identical to the target independent module (function, programming language, manufacturer, version, etc.) may be displayed on the user interface by highlighting the same more than other pieces of information.

When a requester approves the specified comparison software, the Comparison analyser 115 may provide the comparison software to the Simulator 112, and the Simulator 112 may simulate the comparison software in a predetermined manner.

The Date collector 114 may collect result information generated during a simulation process and deliver the same to the Root analyser 113, and the Root analyser 113 may deep learn a corresponding analysis tool based on the received information.

The Time predictor 117 may predict the learning time of the correspondence analysis tool and deliver the same to the Root analyser 113. The Root analyser 113 may deliver the corresponding analysis tool and the predicted creation time to the Monitoring unit 122.

When the creation time of the correspondence analysis tool exceeds the reference time and there is at least one past analysis tool selected by a predetermined selection method, the Monitoring unit 122 may inquire through the Interface calculator 130 whether root cause analysis is allowed through the past analysis tool during the learning time of the corresponding analysis tool.

In this regard, when a requester approves, the predetermined replacement condition is satisfied. Then, the Monitoring unit 122 may select one of the past analysis tools using a predetermined selection method, and may analyze the root cause of the target software based on the selected past analysis tool while the corresponding analysis tool is being trained.

When a requester approves the monitoring process, the Monitoring unit 122 may monitor abnormal operations of the target software in real time using a corresponding analysis tool or a past analysis tool.

To this end, the computing device of a requester may transmit operation information to the Monitoring unit 122 through the Interface calculator 130.

The Monitoring unit 122 may detect abnormal signs of the target software, perform causal analysis, and perform root cause analysis.

The root cause analysis system of an embodiment of the present disclosure may monitor a plurality of pieces of software simultaneously and analyze the root cause.

Moreover, the root cause analysis system of an embodiment of the present disclosure may analyze the root cause by simultaneously monitoring a plurality of pieces of software operating in a heterogeneous virtualization environment.

For example, the root cause may be analyzed by simultaneously monitoring a plurality of pieces of software operating in a general virtual machine environment and a virtualization environment in a container environment.

Hereinafter, the detailed descriptions may be omitted to the extent of overlap with the aforementioned content.

From the aforementioned disclosure, the root cause analysis of microservices can be easily and accurately analyzed based on anomaly detection.

Unlike the aforementioned content, deep learning models may be requested, received, and used from open source platforms.

Accordingly, the detailed descriptions may be omitted to the extent of overlap with the aforementioned content.

In the attached drawings, in order to more clearly express the technical idea of the present disclosure, configurations that are unrelated or less relevant to the technical idea of the present disclosure are briefly expressed or omitted.

Hereinabove, the configurations and features of the present disclosure have been described based on the embodiments according to the present disclosure, but the present disclosure is not limited thereto. It is obvious to those skilled in the art that various changes or modifications can be made within the spirit and scope of the present disclosure. Therefore, it is stated that such changes or modifications fall within the scope of the appended claims.

| [Description of Reference Numerals] | |
| --- | --- |
| 100: Root cause analysis system | 110: Analysis tool calculator |
| 120: Cause analyser | 130: Interface calculator |

What is claimed is:

1. A root cause analysis system, comprising:

at least one memory configured to store thereon computer program code; and at least one processor configured to access the at least one memory and operate according to the computer program code to implement:

an Analysis tool calculator that calculates a corresponding analysis tool, which is a member of analyzing a root cause of target software, among a plurality of pieces of software that operate in a heterogeneous virtualization environment, based on comparison software configured of corresponding independent modules, which are independent modules classified by function to correspond to the target software and executed and managed independently, wherein the target software is software to be analyzed, operates in a microservice environment, and is configured of target independent modules, which are independent modules that are executed and managed independently; and a Cause analyser that analyzes the root cause of an abnormal operation occurring in the target software using the corresponding analysis tool, wherein the Analysis tool calculator comprises a Module collector that collects a corresponding independent module from an external server, a Comparison analyser that configures the comparison software by configuring the corresponding independent module identical to a target independent module, a Simulator that simulates the comparison software through a predetermined control method; and a Root analyser that calculates the corresponding analysis tool based on result information, which is data generated while the comparison software is simulated, wherein, when the Module collector fails to collect the corresponding independent module that matches the target independent module, the Comparison analyser configures the comparison software by including at least one corresponding independent module similar to the target independent module within a scope that a predetermined compensation condition is satisfied.

2. The system of claim 1, wherein the Analysis tool calculator further comprises a Date collector that collects the result information composed of log information, metric information, and trace information generated during a simulation process utilizing different data collection members.

3. The system of claim 2, wherein the Date collector uses a Fluentd data collection member for the log information, a Prometheus data collection member for the metric information, and a Jaeger data collection member for the trace information.

4. The system of claim 2, wherein the Root analyser calculates the corresponding analysis tool by performing deep learning based on the predetermined control method and the result information.

5. The system of claim 1, wherein:

the Analysis tool calculator further comprises a Correspondence analyser that calculates a coincidence rate of the result information for the root cause for two pieces of software using a predetermined comparison method; and wherein the predetermined compensation condition is a condition where the coincidence rate is greater than a predetermined reference.

6. The system of claim 1, wherein:

the Analysis tool calculator further comprises a Time predictor that calculates a creation time, which is a time expected for the Root analyser to calculate the corresponding analysis tool through deep learning; and wherein the Cause analyser comprises a Cause storage where a past analysis tool, which is a member of analyzing the root cause of past software, which is software that operates in a microservice environment in the past, is stored, and a Monitoring unit that selects one of the past analysis tools using a predetermined selection method during the time the corresponding analysis tool is calculated, and analyzes the root cause of the target software based on the selected past analysis tool when a predetermined replacement condition is satisfied.

7. The system of claim 6, wherein:

the predetermined replacement condition is a condition in which the creation time exceeds a reference time; and the Monitoring unit considers a reference time when the comparison software is determined only with the corresponding independent module identical to the target independent module and a reference time when the comparison software is determined to include the corresponding independent module that is similar to and not identical to the target independent module differently from each other.

8. The system of claim 7, wherein the predetermined selection method comprises a first selection method selected based on whether detailed information matches in a predetermined order, and a second selection method that selects the highest correspondence rate.

9. The system of claim 1, further comprising an Interface calculator that provides a user interface to a requester who has requested root cause analysis of the target software, wherein the Interface calculator provides a predetermined notification to the requester when a situation occurs in which the comparison software is configured only with the corresponding independent module identical to the target independent module in a state where the Module collector analyzes the root cause of the target software with a trained corresponding analysis tool in a state where the corresponding independent module identical to the target independent module has not been collected.

10. A root cause analysis method, the method being implemented by a root cause analysis system configured to analyze a root cause of software operating in a microservice environment, the root cause analysis system comprising at least one memory configured to store thereon computer program code; and at least one processor configured to access the at least one memory and operate according to the computer program code, the method comprising:

calculating a corresponding analysis tool, which is a member of analyzing the root cause of target software, among a plurality of pieces of software that operate in a heterogeneous virtualization environment based on comparison software configured of corresponding independent modules, which are independent modules classified by function to correspond to the target software and executed and managed independently, wherein the target software is software to be analyzed, operates in the microservice environment, and is configured of target independent modules, which are independent modules that are executed and managed independently; and analyzing the root cause of an abnormal operation occurring in the target software utilizing the corresponding analysis tool, wherein calculating the corresponding analysis tool comprises:

collecting a corresponding independent module from an external server;

configuring the comparison software by configuring the corresponding independent module identical to a target independent module;

simulating the comparison software through a predetermined control method; and calculating the corresponding analysis tool based on result information, which is data generated while the comparison software is simulated, wherein the method further comprises, when collecting of the corresponding independent module that matches the target independent module fails, configuring the comparison software by including at least one corresponding independent module similar to the target independent module within a scope that a predetermined compensation condition is satisfied.

* * * * *